Feb. 13, 1968        H. S. DAVIS        3,369,204
SEQUENCING DEVICE
Filed Feb. 17, 1966        2 Sheets-Sheet 1
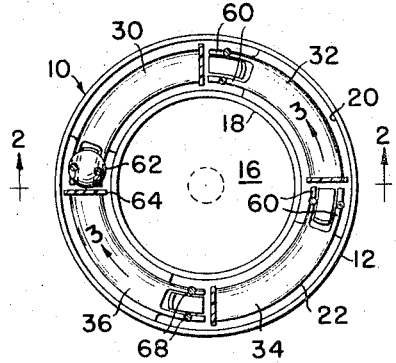
FIG. 1
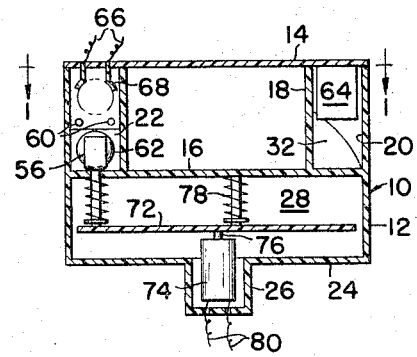
FIG. 2
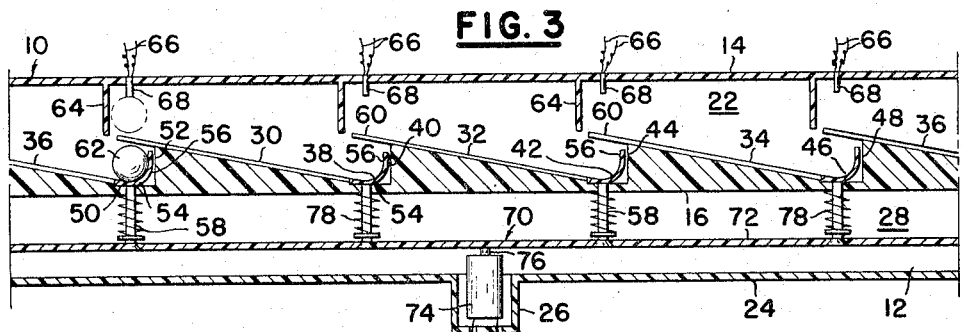
FIG. 3
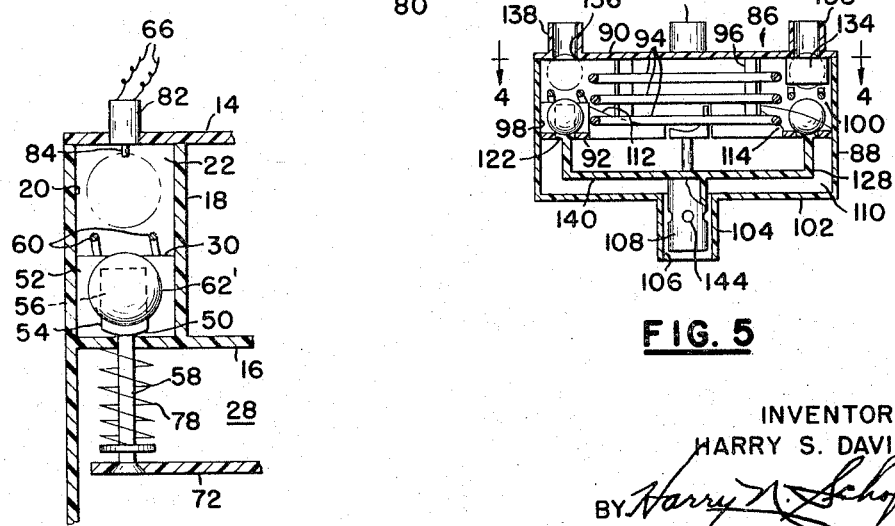
FIG. 2-A
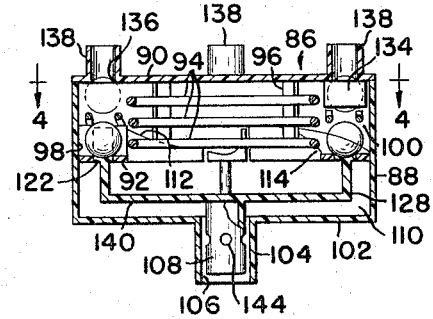
FIG. 5
INVENTOR
HARRY S. DAVIS
BY *Harry N. Schofer*
ATTORNEY

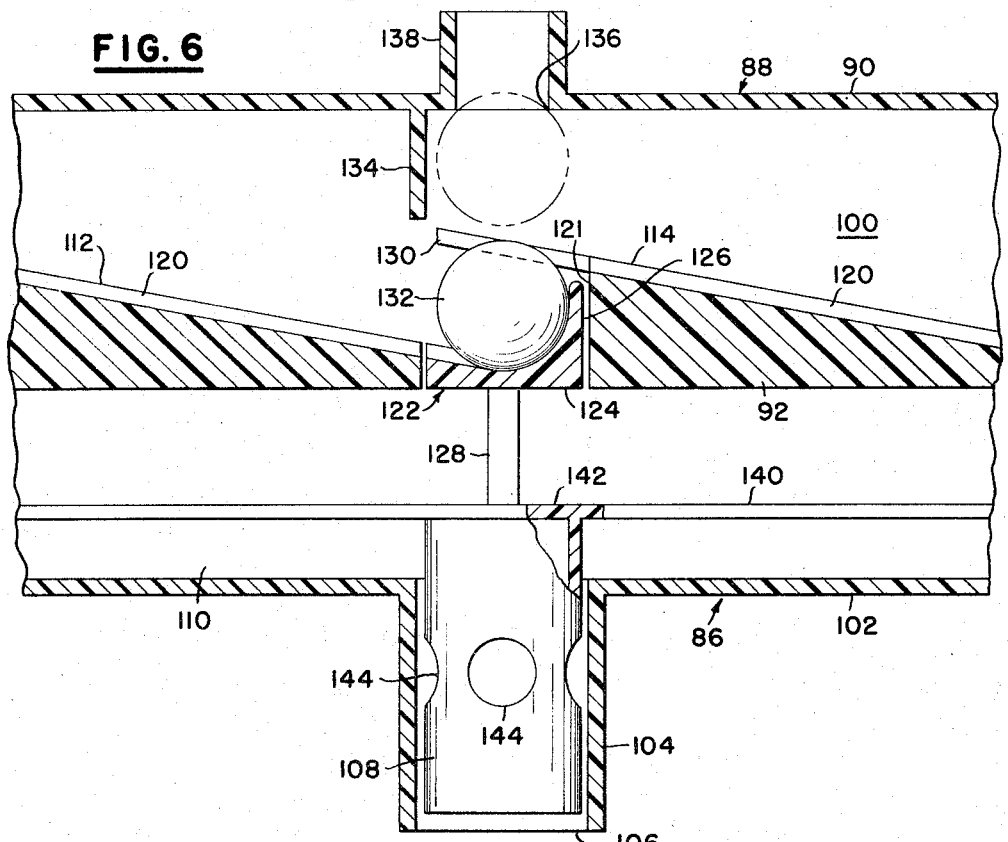
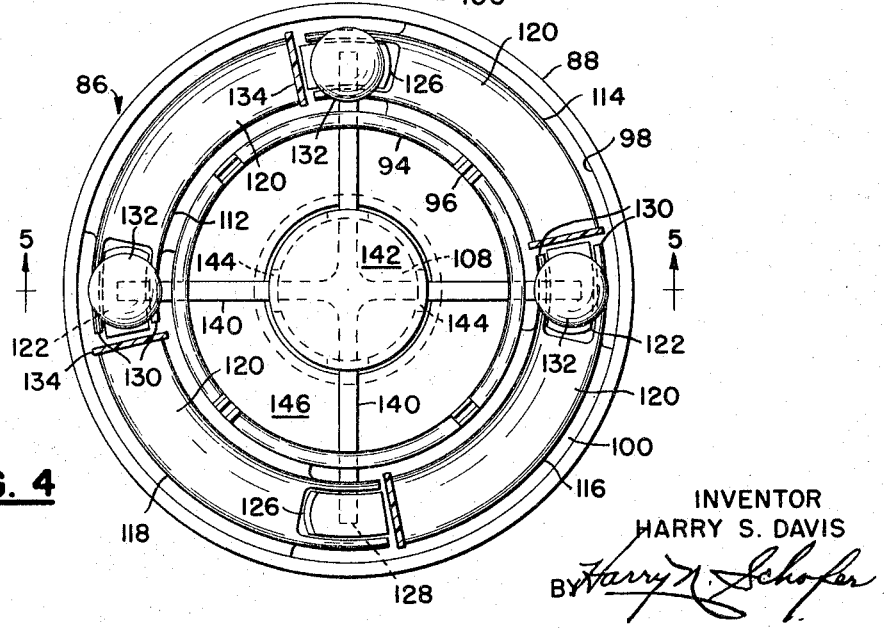

United States Patent Office 3,369,204
Patented Feb. 13, 1968

3,369,204
SEQUENCING DEVICE
Harry S. Davis, Fort Lauderdale, Fla., assignor to Davis Flow Valve, Inc., Fort Lauderdale, Fla., a corporation of Florida
Filed Feb. 17, 1966, Ser. No. 528,176
10 Claims. (Cl. 335—138)

This invention relates to a sequencing device, and more particularly to a sequencing device having novel constructional and operating features for sequentially actuating a flow distributor, either for the flow of fluid or for the flow of an electrical current.

While the invention is useful in a number of different fields, it finds especial application in irrigation systems, and will be described hereinafter in that environment.

In irrigation systems, there is usually a supply of water, which may be a river, reservoir, elevated storage tank, standpipe, pump, etc. The area to be irrigated does not require constant irrigation, but is usually supplied with water a relatively short time every day or at less frquent intervals. It is not practical to irrigate the entire area simultaneously, and therefore the area is usually subdivided into two or more zones, each zone having a branch from the water supply, there being a distributing valve or valves to selectively and/or sequentially feed water to each branch.

There may be a manifold connection to the main supply and a valve in each branch, or a single distributing valve, having a plurality of outlets, which may be selectively operated to feed water to a branch.

Such distributing valves are usually complex, and require frequent and costly service and repair. In most instances they cannot be modified to supply more than one outlet at a time, or if so, they require major modification.

It is an object of this invention to provide a novel sequencing device which is positive in operation, fool proof, and requires a minimum amount of service.

It is a further object of this invention to provide a novel sequencing valve that can be modified to supply liquid to one or more branches simultaneously simply by adding or removing ball means therein.

It is a still further object of this invention to provide a novel sequencing device for a flow conductor in which the flow controlling elements are mechanically moved in one direction, and are gravity actuated in another direction.

With these and other objects and advantages in view, the invention comprises an endless passage, preferably annular, the bottom wall of which includes a series of ramps sloping in the same direction, the foot of one ramp being connected to the high point of the adjoining ramp by a substantially vertical wall. At the foot of each ramp, adjacent a vertical wall, there is an elevator, and directly above each elevator, either in the top wall or in a side wall of the endless passage, there is a flow conductor, either for the flow of an electrical current or for the flow of a fluid. Ball means are provided, at least one less than the number of flow conductors, which are raised simultaneously by the elevators. Where the flow conductor carries an electrical current, the conductor includes a switch above each elevator, and where the flow conductor carries a fluid, the conductor includes a circular outlet forming a valve seat above each elevator. For a flow conductor for electricity, the ball means are made of electrical conductive material, and when the ball means are raised, the balls bridge the spaced switch terminals to close the switch. If desired, mechanically operated switches can be provided, which are actuated to close by the ball means when raised and opened when the ball means are lowered.

When the flow conductors are for fluids, the ball means are larger than the valve seats, and are made of a material having a specific gravity greater than that of the fluid being regulated, so that, when the elevators are raised, the ball means are brought into register with the valve seats to stop the flow of fluid therethrough. Means are also provided to supply fluid to the endless passage. When the elevators are lowered, the ball means are lowered, by gravity, onto an extension of the adjacent high point of a ramp to roll down its slope to the elevator at the foot thereof, thereby either opening the switch or the valve seat, and permitting the ball means, under the force of gravity, to move to the next sequential operating position.

A clear understanding of the construction and operation of the invention will be gained from the following detailed description and from the accompanying drawings. While the following description relates to an irrigation system, it is obvious that the invention is not so limited, but finds application in many other fields.

Reference is made to the accompanying drawings, in which:

FIG. 1 is a top plan view of a first embodiment of the invention of a sequencing device for electrical conductors, as seen along the line 1—1 of FIG. 2;

FIG. 2 is a sectional view, taken along the line 2—2 of FIG. 1 in the direction shown by the arrows;

FIG. 2A is a fragmentary sectional view, similar to FIG. 2, showing a different form of electrical switch;

FIG. 3 is a developed sectional view, looking toward the center, along the line 3—3 of FIG. 1;

FIG. 4 is a top plan view of a second embodiment of the invention, with the cover removed, of a sequencing device for fluid conductors, as seen along the line 4—4 of FIG. 5;

FIG. 5 is a sectional view, taken along the line 5—5 of FIG. 4; and

FIG. 6 is an enlarged sectional view, the upper one-half being taken along the annular endless passage and the lower one-half taken through the central valve inlet of FIG. 4 showing the various parts in greater detail.

Referring to FIGS. 1, 2 and 3, illustrating a first embodiment of the invention for a sequencing device for a series of electrical flow conductors, in which the sequencing device is designated in its entirety by the numeral 10, there is shown a hollow housing 12 covered with a removable top or lid 14. A partition 16 about midway of the housing divides the housing into upper and lower chambers. An annular inner wall 18 extends between the partition 16 and the lid 14. The housing also includes an outer wall 20. The lid 14, inner wall 18, outer wall 20, and partition 16 define the top wall, inner side wall, outer side wall, and bottom wall, respectively, of an endless passage 22.

The lower end of the housing 12 is closed by a bottom 24 having a central depending tubular portion 26. The space between the bottom 24 and the partition 16 defines a chamber 28 for an operating means, as will be set forth in detail later in this description.

That portion of the partition 16 defining the bottom wall of the endless passage 22 is contoured to form a series of grooved ramps 30, 32, 34 and 36, all sloping in the same direction. A series of elevators interconnect the foot of each ramp with the high point of the adjacent ramp. Between the foot of ramp 30 and the high point of the adjacent ramp 32 there is an elevator 38 and a substantially vertical wall 40; an elevator 42 and a substantially vertical wall 44 interconnect the foot of the ramp 32 and the high point of the adjacent ramp 34; an elevator 46 and a substantially vertical wall 48 interconnect the foot of the ramp 34 with the high point of the adjacent ramp 36; and an elevator 50 and a substantially vertical wall 52 interconnect the foot of the ramp 36 with the high point of the adjacent ramp 30.

Each of the elevators 38, 42, 46 and 50 comprises a saddle 54 having a horn or back stop 56 remote from the foot of the ramp and adjacent the adjoining vertical wall of the next ramp. The saddle 54 and the back stop 56 are concave, being of spherical contour to receive ball means, as will be described more fully hereinafter. Extending downwardly from each saddle, through a non-circular aperture in the partition 16, is a non-circular operating shaft 58, to prevent rotation of the elevator.

A pair of spaced, resiliently movable, track extensions 60 extend in an axial direction from the high point of each ramp, to overlie the adjacent elevator. In the example illustrated, the track extensions are made of resilient material, so that they can be spread apart by ball means when raised by the elevators, as will appear later in this specification. It will be understood that other forms of mounting of the extensions may be used.

One or more freely movable ball means 62 are provided in the endless passage 22. In the embodiment shown in FIGS. 1, 2 and 3, the ball means is made of electrical conductive material, and may be solid or hollow, or it may be made of any other material, hollow or solid, and having a coating of electrical conductive material. Each ball means 62 has a diameter sufficient to permit free rolling down the grooved ramps and track extensions 60. The diameter of each ball means is greater than the spacing between each pair of track extensions 60 so that, when the ball means is deposited on the extensions, it is free to roll down the extensions and the connecting ramp, as will appear later. On the other hand, the saddle 54 and back stop 56 of each elevator have a width less than the spacing between the movable track extensions 60 to permit free movement between the extensions when the elevators are raised and lowered.

A series of spaced projections 64 attached to the lid 14, extend downwardly into and across the upper portion of the endless passage 22. As shown in FIGS. 1 and 3, each of these projections is disposed to that side of the elevator opposite the back stop 52, sufficiently spaced therefrom to permit the ball means 62, when the elevator is raised, to occupy the chamber formed between the saddle 50, back stop 52, lid 14 and projection 64 without contacting the projection.

Directly above each elevator, and attached to the lid 14, is an electrical flow conductor comprising a pair of electrical leads 66 and a pair of spaced switch contacts or terminals 68. While the switch terminals are shown as being attached to the lid 14, it is evident that they could be disposed in the side walls 18 or 20, or attached to the projections 64.

The projections 64 extend downwardly into the endless passage 22 to a position high enough above the ramp to permit free passage of the ball means 62 down the ramp onto the elevator at the foot thereof. Similarly, the track extensions 60 are disposed sufficiently above the elevators to permit uninterrupted passage of the ball means onto the saddle of the elevator immediately below the extensions.

In the chamber 28 between the partition 16 and the bottom 24 there is an operating means 70 comprising a disc 72 and a fixed solenoid 74 mounted within the depending tubular portion 26, the solenoid 74 having a movable plunger 76 attached to the disc 72 to raise and lower the disc when the solenoid is energized and deenergized. A compression spring 78 surrounds each operating shaft 58, the upper end of each spring resting against the lower face of the partition 16 and the lower end of each spring resting against a disc connected with the operating shaft, to urge the elevators downwardly. The lower end of each operating shaft contacts the disc 72 so that the elevators move with the disc when the latter is raised and lowered. A pair of electrical leads 80 are connected with the solenoid 74, the leads being connected with a source of electrical current and with a circuit maker and breaker to energize and deenergize the solenoid when desired.

When used to sequentially operate an irrigation system, each of the flow conductors comprising the electrical leads 66 and the switch terminals 68 is connected with an electromagnetically-actuated normally closed valve (not shown) in a branch of a multiway irrigation system. The leads 80 of the solenoid 74 may be connected with a timing device, not shown, to energize the solenoid when irrigation is desired.

The operation is as follows:

Let us assume that it is desired to sequentially operate, one at a time, the four branches of an irrigation system, each branch having one or more spray heads or outlets for the discharge of water. In such case, only one ball means 62 is provided, as shown. It is evident that if it is desired to operate two branches at one time, two ball means are provided, and so on.

FIGS. 1, 2 and 3 illustrate the parts in their inoperative position, when no current flows to the operating solenoid 74. In this condition, the ball means 62 is shown, in full lines, resting on the saddle 54 of the elevator 50, against the back stop 56. All elevators are at their lowermost position, being held in that position by the springs 78 and by the force of gravity.

When it is desired to irrigate, the timer, not shown, closes the circuit to energize the solenoid 74 which, through its plunger 76, raises the disc 72 and all of the elevators 38, 42, 46 and 50. It is evident that the circuit can be energized manually, or by any automatic means. As explained above, the width of the saddle 54 and back stop 56 of each elevator is sufficiently small to allow the elevator to pass between the spaced movable track extensions 60. Elevator 50, with the ball means 62 thereon, is also raised, whereby the ball means 62 spreads the movable track extensions apart to allow its passage therethrough, after which the track extensions resume their parallel relationship as soon as the ball means passes above them into the position shown in broken lines. In this position the ball means 62 contacts both switch terminals 68, and since the ball means is made of electrical conductive material, a flow of electrical current is established through the electrical leads 66 and to the electromagnetically-actuated valve (not shown) in the irrigation branch line in circuit therewith. The electromagnetically-actuated valve is opened, and water is permitted to flow through the branch controlled thereby. So long as the solenoid 74 remains energized, the ball means 62 is maintained in contact with the spaced switch terminals 68 and the electromagnetically-actuated valve remains in open position.

When it is desired to discontinue irrigation in that particular branch, the circuit to the solenoid 74 is broken manually or by operation of the timer, and the disc 72 and the elevators 38, 42, 46 and 50 return to their lowermost position, by gravity and by action of the springs 78. As the elevator 50 lowers, the ball means 62 thereon follows. The saddle 54 and the back stop 56 of the elevator 50, being narrower than the spacing between the track extensions 60 of the ramp 30, pass between the extensions. The ball means 62, having a diameter greater than the spacing between the track extensions 60, comes to rest on the extensions as the elevator and the back stop continue downward to a position in which the back stop no longer contacts the ball means. The resilient force which urges the track extensions into the parallel relationship shown is sufficiently great to prevent separation of the track extensions by the weight of the ball means. Since the track extensions are inclined in the same direction as the ramps to which they are connected, the ball means rolls down the track extensions 60 and the ramp 30, toward the right of FIG. 3, onto the saddle 54 and back stop 56 of the elevator 38. As the elevator 50 was lowered, the ball means 62 broke the connection between the spaced switch terminals 68, thus deenergizing the electromagnetically-actuated valve connected thereto, and permitting closing of that normally closed valve.

The ball means 62 has now moved to a position below the next flow conductor of the sequentially actuated system, so that, when the solenoid 74 is again energized, manually or otherwise, the elevator 38 will raise the ball means 62 into position to close the switch terminals 68 of the flow conductor immediately above it. It may be seen, therefore, that each time the solenoid 74 is energized, the elevators are raised, the ball means bridges the spaced switch terminals 68 above the elevator carrying the ball means 62, and when the solenoid 74 is deenergized, the elevators are lowered and the ball means rolls down the next succeeding ramp onto the elevator at the foot thereof into the next operating position, in sequence. In this manner, the ball means travels down the ramps in the endless passage throughout a complete cycle, and sequentially open and close the valves in the irrigation system.

FIG. 2A illustrates a modification of the embodiment shown in FIGS. 1, 2 and 3, in which corresponding parts are designated by the same reference numerals. In this modification, a microswitch 82 is employed in place of the switch terminals 68, and the movable operator 84 thereof extends downwardly into the endless passage 22. The microswitch 82 is normally open, and is moved into a circuit making position when the ball means 62' forces the movable operator 84 upwardly, and in a circuit breaking position when the ball means is lowered. In this modification the ball means may be made of any suitable material, such as wood, plastic, or metal which may or may not have electrical conductive properties.

The housing, in both embodiments, may be made of any suitable material, such as metal or plastic.

FIGS. 4, 5 and 6 illustrate a second embodiment of my invention constructed to cause sequencing operation of a fluid distribution system.

The sequencing system in this embodiment is designated in its entirety by the numeral 86, and comprises a hollow housing 88 having a removable lid 90, and a partition 92 spaced below the lid. The partition 92 is in the form of an annulus, its outer side connecting with an outer wall 98 of the housing. Between the inner edge of the partition 92 and the lid 90 there is provided a grid construction comprising a series of parallel spaced rings 94 interconnected by a series of spaced connecting members 96. The grid construction may be supported either by the lid 90 or by the inner edge of the partition 92. The lid 90, partition 92, grid construction 94 and 96, and the outer side wall 98 define the top wall, bottom wall, inner side wall, and outer side wall, respectively, of an endless flow passage 100. The housing 88 also includes a bottom 102 spaced below the partition 92, the bottom having a depending tubular portion 104 forming a fluid inlet 106 for admitting a fluid into the interior of the sequencing device. A piston type valve 108 is loosely mounted within the tubular portion 104 to control the admission of fluid into the interior of the housing, the valve forming a part of an operating means as will be discussed more fully hereinafter.

The space between the partition 92, outer side wall 98, and bottom 102 define a chamber 110 for an operating member, a portion of which includes the valve 108.

The bottom wall of the endless passage 100 is contoured to form a series of ramps, four being shown in the example illustrated in the drawings, and designated 112, 114, 116 and 118. Each ramp has a central groove 120 forming a track for one or more ball means, as will appear later in this description. The high point of each ramp is connected with the foot of the preceding ramp by a substantially vertical wall 121 and an elevator 122. All of the ramps slope in the same direction.

Each elevator comprises a saddle 124 having a projection 126 adjacent the substantially vertical wall 121 forming a back stop, and a downwardly extending operating shaft 128. A pair of spaced, parallel, resiliently movable track extensions 130 project from the high point of each ramp directly above each elevator, the extensions having substantially the same inclination as the ramp. These extensions may be hingedly mounted with resilient means to urge them into the parallel relationship shown when forced apart, or they may be made of resilient material to inherently return them to their parallel relationship when spread apart.

A plurality of ball means 132 are freely movable in the endless passage 100. The ball means have a density greater than that of the fluid flowing through the sequencing valve. The ball means have a diameter less than the spacing of the walls defining the passage 100 and a diameter greater than the spacing between the pair of track extensions 130, so that the track extensions are spread apart to permit passage of the ball means when they are raised by the elevators, as will appear hereinafter. On the other hand, the saddles 124 and the back stops 126 are narrow enough to freely move between the track extensions 130 when the elevators are raised and lowered.

A series of projections 134, attached to the lid 90, extend downwardly into the endless passage 100. The projections 134 may have a width less than or the same as the passage 100, and extend downwardly to a position above the foot of the ramp sufficient to permit free passage of the ball means 132 below the projection. Adjacent each projection 134 and directly above each elevator 122, there is a fluid flow conductor comprising a circular aperture 136 in the lid 90 and a conduit 138 extending therefrom, providing a series of outlets leading to branches of a fluid distribution system. The projections 134 are disposed on the opposite side of the elevators from that occupied by the back stops 126, and are sufficiently spaced therefrom so that, when a ball means 132 is raised on an elevator 122, the ball means does not contact the adjacent projection 134.

It is evident that the apertures 136 and the conduits 138 may be disposed in the side wall 98 instead of in the lid 90. It is not necessary that the elevators 122 raise and retain the ball means 132 into the valve closing positions, but the elevators may raise the ball means into proximity with the apertures and the pressure of the fluid in the endless passage 100 will move the ball means against the apertures 136 and retain them in valve closing position.

The operating means for the elevators 122 also includes four radial arms 140 extending from the valve 108, each arm being attached to or integral with the lower end of an operating shaft 128.

The valve 108 is hollow, the lower end being open and the upper end being closed at 142, the closure being attached to or integral with the radial arms 140. The side wall of the valve 108 includes a series of spaced apertures 144, the apertures being sufficiently spaced from the upper closed end so that, when the valve 108 is raised by the pressure of the incoming fluid, the apertures extend above the upper end of the depending tubular portion 104 to discharge the incoming fluid into the operating means chamber 110 and thence into a central fluid chamber 146 defined by the lid 90 and grid structure comprising the rings 94 and connecting members 96.

In the example illustrated, there are four outlet apertures 136, forming valve seats for the ball means 132, and three ball means 132, forming valves to control the discharge of fluid through the flow conductors. The ball means have a greater diameter than the apertures 136 to obstruct flow through the apertures when the ball means are raised by the elevators 122 into position to close the valve seats in the apertures.

The operation of the embodiment illustrated in FIGS. 4, 5 and 6 is as follows, assuming that the sequencing device 86 is intended for distribution of irrigation water to a number of outlets (not shown) connected with the flow conductors comprising the apertures 136 and the conduits 138, each conduit leading to a series of spray heads, and water being supplied to the fluid inlet 106 under manual control or under the control of timer-controlled valve means upstream of the sequencing valve 86, said manual or timer-controlled valve, not shown, being normally closed but periodically opened and closed for the duration that water is desired to each branch leading from the apertures 136.

It should be noted, in the example illustrated, that there are four outlets or apertures 136 controlled by three ball means 132. Therefore, when the elevators 122 are raised, the three ball means obstruct flow through three of the outlets 136 and leave one outlet unobstructed for the free flow of water through the conduit 138 connected therewith, and to the spray heads, not shown, of the irrigation system connected therewith.

FIGS. 4, 5 and 6 illustrate the parts of the system in their inoperative position, with the three ball means 132 at rest on three elevators 122, all of the outlets or apertures 136 unobstructed, the elevators 122 and operating means 108, 140 and 142 in their lowermost positions, the valve (not shown) upstream of the sequencing valve 86 closed and no liquid flowing through the system. The sequencing valve would be filled with liquid from a previous operating cycle.

When the timer opens the valve upstream of the sequencing valve, the water, under pressure from any supply source, enters the inlet 106. Some of the water seeps around and through the loosely fitting valve 108, but the pressure difference across the valve is sufficient to raise the valve, as well as the elevators 122 connected with it, until the apertures 144 in the side wall of the valves 108 are raised above the bottom 102 to discharge the water into the chamber 110. The valve and the parts connected with it will be maintained in their raised position so long as water continues to flow through the sequencing valve 86.

As the elevators 122 are raised, the ball means 132 on three of them are forced through the track extensions 130, spreading the track extensions apart. As the ball means pass above the track extensions, the extensions resume their parallel relationship shown in FIG. 4 under the ball means, and the ball means and the saddles continue their upward movement until the ball means come to rest in or adjacent the valve seats formed by the apertures 136, as shown in broken lines. As explained above, the saddles 124 and the back stops 126 are narrow enough to pass between the track extensions 130 without contacting them. The back stops 126 on the one hand, and the projections 134 on the other hand, prevent movement of the ball means axially of the endless passage 100, and the inner side wall 94 and the outer side wall 98 prevent lateral movement. Water admitted into the chamber 110 flows into the connecting central fluid chamber 146 and thence through the spaces between the parallel rings 94 into the endless passage 100 and through the single outlet or aperture 136 that is not obstructed by one of the three ball means 132. The pressure of the water is sufficient to move the ball means 132 against their adjacent valve seats if not so moved by the elevators, and to retain them in valve seating position. Water continues to flow through the unobstructed flow conductor 136 and 138 so long as the timer-controlled valve (not shown) remains open. When the timer-controlled valve is shut off, the water supply to the sequencing valve 86 is discontinued, the pressure across the valve 108 equalizes, and the valve 108, together with the parts connected therewith, under the force of gravity, drop to their lowermost position shown in FIGS. 4, 5 and 6. The loose fitting construction of the valve 108 allows water to seep around the valve so that it may be lowered.

As the valve 108 and the elevators 122 are lowered, the three ball means 132 come to rest on the upper side of the track extensions, opening the apertures 136 above them, while the elevators 122 continue downwardly to their lowermost positions, shown. The resilient force which retains the track extensions in their parallel relationship shown is sufficient to support the weight of the ball means 132, so that the track extensions do not spread, and the ball means are free to roll, under the force of gravity, down the inclined track extensions 130 and the ramps connected therewith, onto the elevators at the feet of the ramps into position to be raised, when the timer-controlled valve, not shown, is again opened.

It is seen, therefore, from the foregoing, that each time the timer-controlled valve is opened and closed, three of the outlets are closed by the three ball means, and one outlet is left unobstructed for the flow of water, and when flow is discontinued, the ball means are permitted to freely roll, under the force of gravity, into a next succeeding position onto elevators directly below three outlets to obstruct flow through those outlets when the timer-controlled valve is again opened. The ball means, having a density greater than that of the water, sink through the water and roll down the ramps. In this manner, four sequential operations of opening and closing of the timer-controlled valve causes a flow, in sequence, through each of the four branches controlled by the flow conductors.

It is evident, from the foregoing, that if it is desired to supply water to two outlets simultaneously, the number of ball means should be two less than the number of outlets, and that if it is desired to supply water to three outlets simultaneously, the number of ball means should be three less than the number of outlets, and so on. This can be accomplished simply by removing the lid and adding or withdrawing ball means.

While the elevators and the operating means connected therewith are lowered by gravity exclusively in the embodiment of the invention illustrated in FIGS. 4, 5 and 6, it is evident that springs may be added to assist gravity, as shown in the embodiment illustrated in FIGS. 1, 2 and 3.

While the embodiments illustrated show four outlets, it is evident that more than four and less than four but more than one outlet may be used, and that the number of ball means must be at least one less than the number of outlets or switches comprising the flow conductors.

Having fully described my invention, it is to be understood that I do not wish to be limited to the details set forth herein but that various changes may be made in the details and proportions without departing from the principles of the invention or from the scope of the annexed claims.

I claim:

1. A sequencing device, comprising: a housing having a bottom wall, a top wall, and side walls defining an endless passage; said bottom wall having a series of ramps sloping in the same direction; a vertically movable elevator in the bottom wall between the foot of each ramp and the high point of the adjacent ramp; a flow conductor connected to one of the other walls directly above each elevator; ball means, at least one less than the number of flow conductors, freely movable in said endless passage, said ball means cooperable with said flow conductors to control flow therethrough; operating means to simultaneously raise and lower said elevators; said ramps providing a track whereby the ball means may roll, under the force of gravity, from the high point of a ramp onto an elevator at the foot thereof; and a resiliently mounted track extension projecting from the high point of each ramp above the adjacent elevator in a position to be moved aside by the passage of the ball means as the latter is raised and to be resiliently returned to a position below the ball means after said ball means has passed above said extension, whereby, when said elevators are simultaneously raised, the ball means thereon forces the track extension aside permitting the elevators to bring the ball means into cooperating register with a flow conductor above the elevator to control flow through said conductor, and when said elevators are simultaneously lowered, said ball means are engaged by said track extension and roll down the connecting ramp onto an elevator at the foot thereof.

2. A sequencing device as defined in claim 1, in which said endless passage is annular.

3. A sequencing device as defined in claim 1, in which each elevator includes a concave saddle to receive one of said ball means.

4. A sequencing device as defined in claim 1, in which each elevator includes a concave saddle and a stop to receive and to retain one of said ball means.

5. A sequencing device as defined in claim 1, in which each elevator includes a concave saddle and a stop to receive and to retain one of said ball means, said stop engaging one face of said ball means; and a projection across the upper part of said endless passage adjacent each flow conductor adjacent a diametrically opposite face of said ball means, said stop and said projection cooperating to retain said ball means on said saddle when in raised position.

6. A sequencing device as defined in claim 1, in which each of said movable track extensions comprises a pair of spaced resilient track members, said spacing being less than the diameter of a ball means.

7. A sequencing device as defined in claim 1, in which each flow conductor includes a pair of spaced switch elements to be closed by a ball means when in elevated position.

8. A sequencing device as defined in claim 1, in which each flow conductor includes a pair of spaced switch elements, and in which each ball means is made of electric conductive material, to bridge said switch elements when said ball means are in elevated position.

9. A sequencing device as defined in claim 1, in which each flow conductor includes a circular outlet forming a valve seat, and said operating means includes means admitting a fluid into said endless passage, said ball means having a specific gravity greater than that of the fluid and a diameter greater than that of said outlet, to close said outlets when in elevated position.

10. A sequencing valve as defined in claim 9, in which said means admitting a fluid into said endless passage includes a loose fitting piston type valve opened by said fluid, said piston type valve being attached to said elevators, whereby said ball means are elevated upon the supply of fluid into said endless passage and lowered when said fluid supply is discontinued.

References Cited

UNITED STATES PATENTS

| | | | |
|---|---|---|---|
| 3,024,334 | 3/1962 | Rhodes | 200—166 |
| 3,154,090 | 10/1964 | Davis | 137—119 |
| 3,224,457 | 12/1965 | Davis | 137—624.18 X |

ALAN COHAN, *Primary Examiner.*